United States Patent
Parola

(10) Patent No.: US 6,708,756 B2
(45) Date of Patent: Mar. 23, 2004

(54) METHOD FOR FIXING COMPONENTS TO A PIPE FOR CIRCULATION OF A FLUID FORMING PART OF A HEAT EXCHANGER, IN PARTICULAR A CONDENSER OF AN AIR-CONDITIONING SYSTEM

(75) Inventor: Andrea Parola, Chieri (IT)

(73) Assignee: Denso Thermal Systems Spa, Turin (IT)

( * ) Notice: Subject to any disclaimer, the term of this patent is extended or adjusted under 35 U.S.C. 154(b) by 0 days.

(21) Appl. No.: 10/164,599

(22) Filed: Jun. 10, 2002

(65) Prior Publication Data

US 2003/0010475 A1 Jan. 16, 2003

Related U.S. Application Data

(60) Provisional application No. 60/297,111, filed on Jun. 8, 2001, and provisional application No. 60/337,784, filed on Nov. 8, 2001.

(30) Foreign Application Priority Data

Jul. 10, 2001 (IT) ..................................... TO2001A0672

(51) Int. Cl.⁷ .................................................. F28F 9/00
(52) U.S. Cl. .......................... 165/67; 165/178; 180/68.4
(58) Field of Search ................... 165/67, 178; 180/68.4

(56) References Cited

U.S. PATENT DOCUMENTS

| 2,635,501 | A | | 4/1953 | Eichner |
| 2,759,082 | A | | 8/1956 | Rea |
| 4,951,371 | A | | 8/1990 | Dalo et al. |
| 5,069,275 | A | * | 12/1991 | Suzuki et al. ................. 165/67 |
| 5,205,349 | A | * | 4/1993 | Nagao et al. ................. 165/67 |
| 6,123,143 | A | * | 9/2000 | Insalaco ...................... 165/67 |
| 6,422,302 | B1 | * | 7/2002 | Hubert ........................ 165/67 |
| 2001/0040026 | A1 | * | 11/2001 | Halm .......................... 165/67 |

* cited by examiner

Primary Examiner—Terrell Mckinnon
(74) Attorney, Agent, or Firm—Sughrue Mion, PLLC

(57) ABSTRACT

A method for fixing components to a pipe for circulation of a fluid forming part of a heat exchanger (1), in particular a condenser of an air-conditioning system, the method envisaging at least one step of preliminary connection of at least one component (4) to the pipe (2), followed by a brazing process in order to obtain final connection of the component (4) to the pipe (2). According to the invention, in the course of said step of preliminary connection, the component (4) is mechanically fixed to the pipe (2) by means of at least one rivet (5) and, following upon said brazing process, fluid-tight sealing is obtained between the component (4), the pipe (2) and the rivet (5) by means of melting of surface material (6).

10 Claims, 3 Drawing Sheets

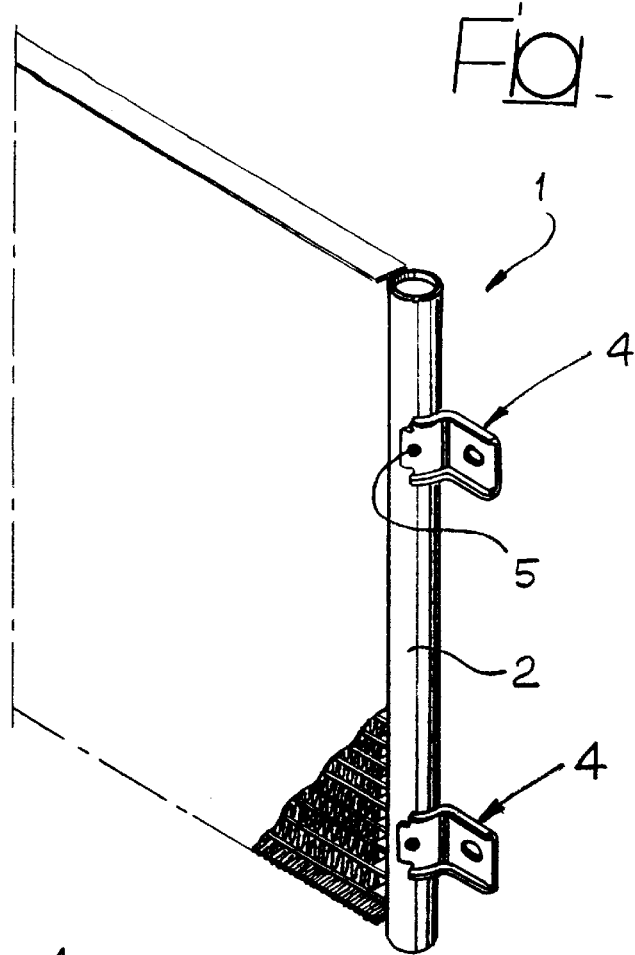
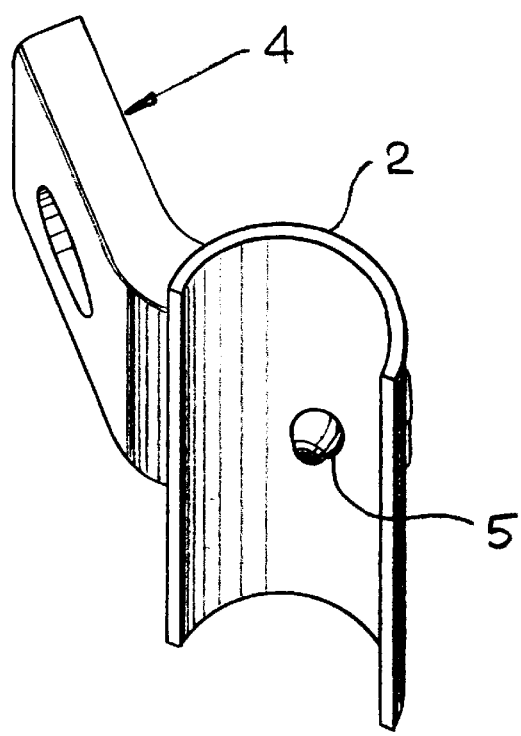

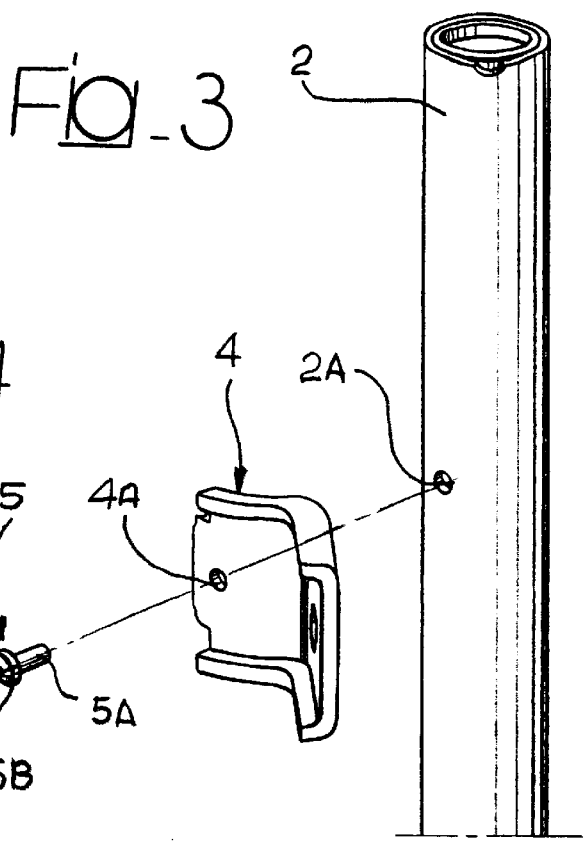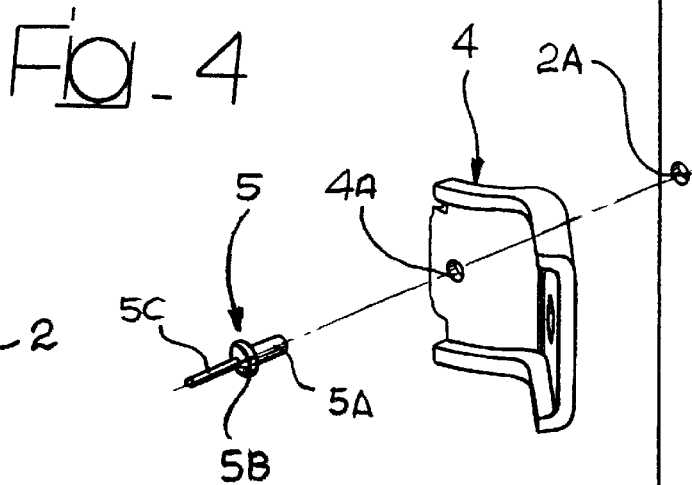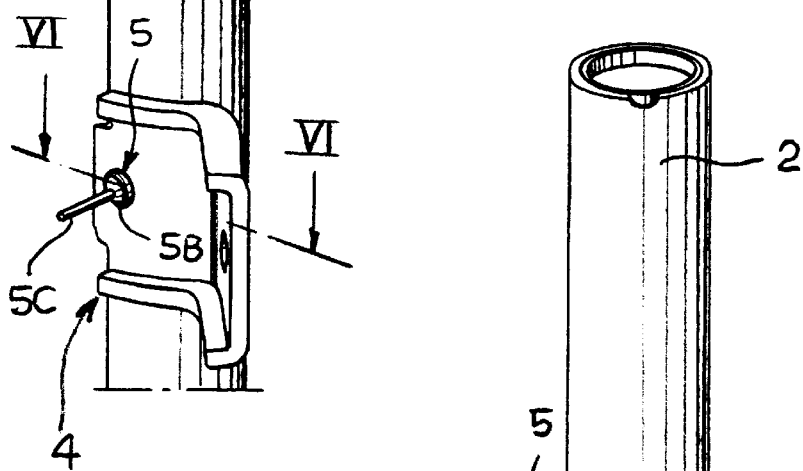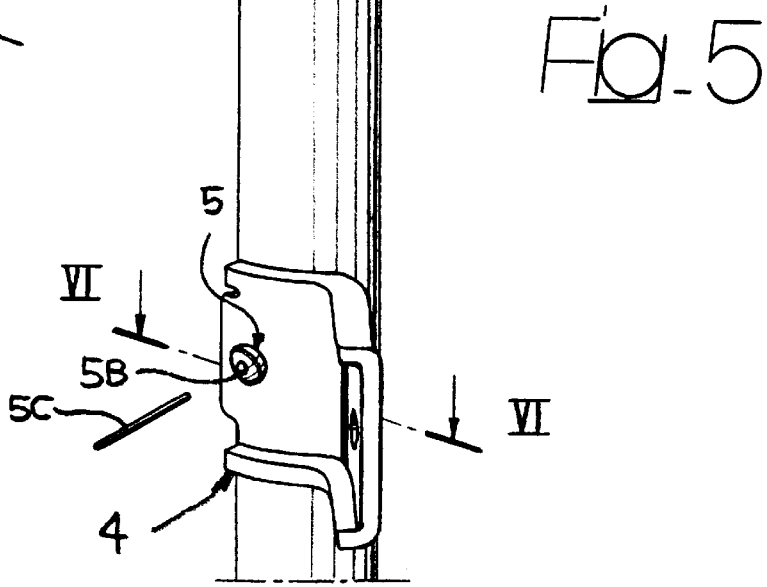

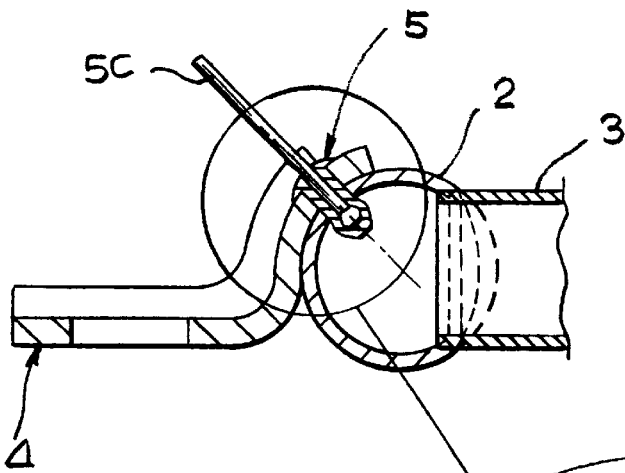
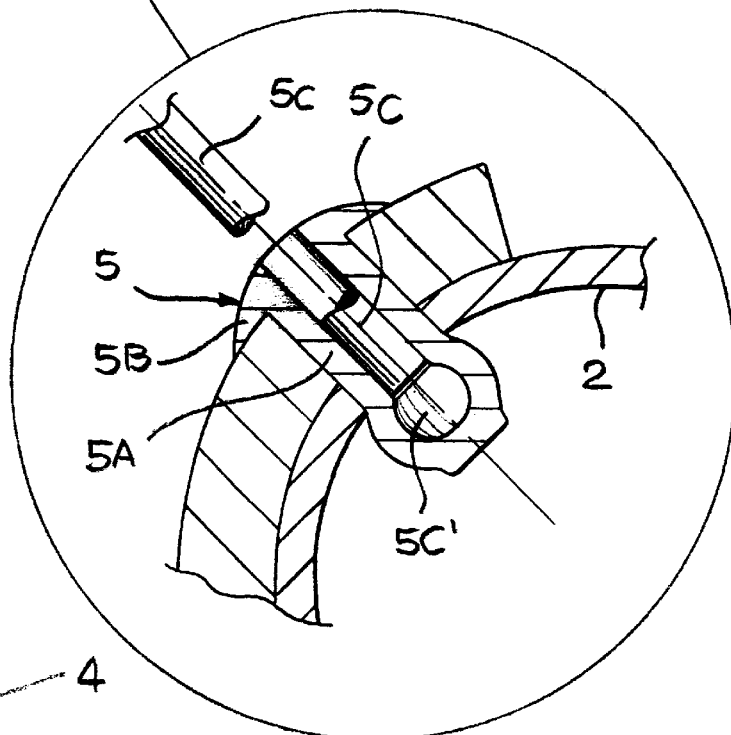
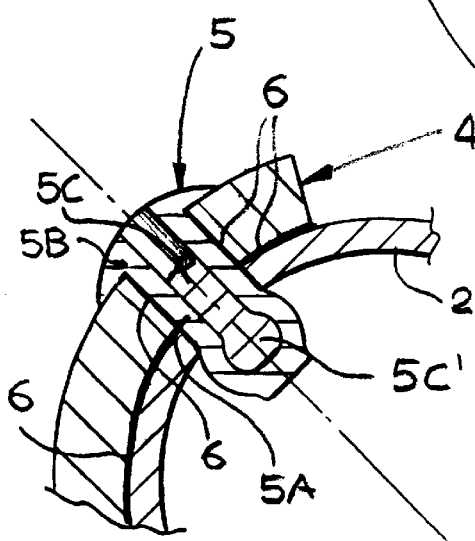

METHOD FOR FIXING COMPONENTS TO A PIPE FOR CIRCULATION OF A FLUID FORMING PART OF A HEAT EXCHANGER, IN PARTICULAR A CONDENSER OF AN AIR-CONDITIONING SYSTEM

This application claims priority of copending provisional application(s) No. 60/297,111 filed on Jun. 8, 2001, and 60/337,784 filed on Nov. 8, 2001, which are hereby incorporated by reference.

BACKGROUND OF THE INVENTION

The present invention relates to a method for fixing components to a pipe for circulation of a fluid forming part of a heat exchanger, in particular a condenser of an air-conditioning system.

It is known that air-conditioning apparatuses or systems comprise at least one pipe for circulation of a cooling or heating fluid, to which various functional components are associated. For example, in the case of condensers forming part of air-conditioning systems for motor vehicles, to one and the same tubular distributor there are rigidly associated one or more supporting brackets, fluid-inlet or fluid-outlet manifolds or connectors, a support for a filter, and similar components.

In order to obtain a condenser, the various components envisaged are preliminarly connected to the tubular distributor and are then definitively fixed thereto subsequently. Typically, the step of preliminary connection of the various components to the distributor, known as "tacking", is carried out by arc spot-welding with weld material (namely, spot welding using a TIG or MIG process). The semi-finished product thus tacked together undergoes a brazing process in a special oven, with process temperatures in the region of 600° C., in order to obtain definitive fixing between the various parts, which bestows the necessary mechanical strength on the assembly.

The present invention is based upon the realization that the known technique of tacking, obtained by spot welding, entails a number of drawbacks.

A first drawback is due to the difficulty of controlling the process in terms of regulation of the welding parameters. In this perspective, it should, for example, be considered that the aforementioned process is not exactly repeatable, in the sense that the weld spots carried out subsequently may have different characteristics from one another. This basically depends upon the changeable welding intensity (which in turn depends upon the welding current) and upon the possible presence of differences in thickness between the parts that are to be welded together.

In the case where the welding spots performed in the tacking step are of small dimensions, there is the risk that the spots will fail to withstand the high treatment temperature typical of the subsequent brazing process. Consequently, the functional component may detach from the respective distributor or tubular pipe and drop inside the brazing oven. On the other hand, in the case where the welding intensity is excessive, there is the risk of causing a perforation in the pipe, the said perforation being hard to detect in so far as the weld material collects inside the perforation itself. In the subsequent brazing step, however, the weld material may melt and thus be responsible for the onset of a leakage in the pipe, which may be detected only in a subsequent stage of the production cycle.

Other variables that further complicate the aforementioned welding process are then due to the difficulty of exact placing of the weld material, to the fact that the welding depth may prove non-constant, and to the fact that the quality of the connection between the parts may be impaired on account of the porosity of the welding spots. The welding process moreover presents problems due to deformation on account of overheating, which brings about geometrical modifications in the distributor, rendering the subsequent assembly thereof with the pipes of the exchanger difficult.

Another drawback of the prior art derives from the fact that, as has already been mentioned, the arc spot-welding process presupposes that the two parts that are to be fixed together should have thicknesses as close to one another as possible. Consequently, in practice the thickness of the various components to be associated to the fluid-circulation pipe is rendered congruent with the thickness of the latter (which is generally very small, typically in the region of 1.2 mm). This, however, is detrimental to the structural strength of the product, since also the corresponding supporting brackets must have a small thickness, at least in the points of fixing to the pipe. It is therefore evident that, in order to increase the sturdiness of the product, it would be possible to increase the thickness of the functional components, and hence also of the respective fluid-circulation pipe; however, this involves a considerable increase in consumption of material.

For the above reasons, then, control of the aforesaid welding process is extremely laborious, and thus slow and costly, in addition to entailing considerable consumption of electric power. Finally, it should be considered that the aforesaid process is very noisy and polluting, which renders it compulsory to use costly auxiliary sound-proofing systems and systems for aspiration of the welding fumes; moreover, the welding system itself is very costly.

From what has been set forth above, it is clear how the arc spot-welding process currently used for tacking the various functional components to the pipes of air-conditioning systems involves high process costs, as well as a high risk of production rejects.

SUMMARY OF THE INVENTION

The purpose of the present invention is to overcome the drawbacks of the prior art, and in this context the main purpose of the invention is to provide a method for fixing components to a fluid-circulation pipe forming part of a heat exchanger, in particular a condenser of an air-conditioning system, that is faster and more economical to implement, more reliable and more easily repeatable than the method currently employed according to the known art.

The above and yet other purposes, which will emerge clearly from what follows, are achieved according to the present invention by a method and a heat exchanger having the characteristics specified in the annexed claims, which are understood as forming an integral part of the present description.

BRIEF DESCRIPTION OF THE DRAWINGS

Further purposes, characteristics and advantages of the present invention will emerge clearly from the ensuing detailed description and from the attached drawings, which are provided purely by way of explanatory and non-limiting example and in which:

FIG. 1 is a schematic representation, by means of a partial perspective view, of a condenser forming part of an air-conditioning system, built according to the teachings of the present invention;

FIG. 2 is a partial and schematic cutaway view of a pipe forming part of the condenser of FIG. 1;

FIG. 3 is an exploded view of one part of the condenser of FIG. 1, in a first step of the tacking process;

FIG. 4 is a schematic representation, by means of a perspective view, of a second step in the process for tacking the condenser of FIG. 1;

FIG. 5 is a schematic representation, by means of a perspective view, of a third step in the process for tacking the condenser of FIG. 1;

FIG. 6 is a cross-sectional view taken along the line VI—VI of FIG. 4;

FIG. 7 represents a detail of a cross section similar to that of FIG. 6, but in the operating step illustrated in FIG. 5; and FIG. 8 represents a detail of a cross section similar to that of FIG. 7, but following upon an operation of brazing of the components represented.

DETAILED DESCRIPTION OF THE INVENTION

In FIG. 1, the reference number 1 designates, as a whole, a condenser forming part of an air-conditioner for a motor vehicle.

The condenser 1 is of a general conception in itself known and comprises a tubular distributor 2 made of aluminium, which is designed to enable circulation of a fluid, here assumed to be a refrigerant gas. To the distributor 2 there are associated, in a known way, dissipating elements, the construction and operation of which are also known and one of which is designated by 3. The reference number 4 designates side brackets for supporting and fixing the condenser 1, which are rendered integral with the distributor 2.

Construction of the condenser 1 envisages a tacking step, during which the various components of the condenser itself are preliminarly tacked together. The semi-finished product thus tacked together then undergoes a brazing process, in order to obtain definitive fixing between the parts.

According to a main aspect of the present invention, the step of tacking, to the distributor 2, of at least some of its functional components is performed by riveting. In this connection, FIG. 2 shows one of the brackets 4, which is preliminarly fixed to the distributor 2 by means of a fluid-tight rivet, designated, as a whole, by 5.

Fluid-tight rivets of the same type as the one designated by 5 are of a general conception in itself known. Here it will suffice to point out that, as emerges, for example, from FIG. 3, the rivet 5 comprises a prevalently cylindrical body 5A defining a front flange 5B. Embedded in the material constituting said body 5A is one end 5C' of a shank or spindle 5C, said end having a larger section than the prevailing section of the shank itself (in the case exemplified, the end 5C' of the shank 5C has a basically spherical shape).

In the preferred embodiment of the invention, the body 5 is made of an aluminium alloy poor in silicon and magnesium, having a high melting point. By way of example, the body of the rivet 5 may be made of alloys corresponding to the codes AA1000 and AA3000 of the Aluminium Association. In any case, the material used for making the fluid-tight rivets employed for the tacking step according to the invention is compatible with the process temperature adopted in the course of the subsequent brazing step. At least the outer surface of the distributor 2 (and possibly the surface of the distributor in contact with the bracket 4) is plated beforehand by deposition of a low-melting material.

As may be noted in FIG. 3, in order to carry out tacking, in respective points of the pipe 2 and of the brackets 4, through holes, designated by 2A and 4A, are preliminarly defined, which are designed to receive the rivets 5. The bracket 4 is then positioned on the distributor 2 in such a way that the hole 4A is aligned with the hole 2A. The cylindrical body 5A of the rivet 5 is then inserted into the aforesaid aligned holes, until the flange 5B of the rivet 5 comes to bear upon the outer surface of the bracket 4, as may be seen in FIG. 4.

By means of a riveting machine, of a type in itself known, a tensile force is exerted on the shank 5C, so as to produce a movement of the latter with respect to the body 5A. The translation of the end 5C' of the shank 5C thus causes a mechanical deformation of the end area of the cylindrical body 5A, which is thus widened, as may be seen, for instance, in FIGS. 2 and 6 to 8. This widening enables mechanical and secure fixing of the bracket 4 to the distributor 2 in a clearly determined position. Once a certain limit of applied load is reached, the shank 5B breaks in a predetermined point. In this way, as may be noted in FIG. 7, the part of shank 5C comprising the end 5C' remains inside the body 5A, whilst the remaining part can be definitively removed from the rivet 5, as may be seen in FIG. 5.

Upon completion of the tacking operation described above, the semi-finished product made up of the distributor 2 with the various functional components associated thereto, among which the brackets 4, undergoes a brazing process, which is carried out according to modalities and using means in themselves known. In the course of said brazing process, melting of the low-melting material present at least on the outer surface of the distributor 2 completes fixing of the bracket 4 to the distributor itself. In particular, as regards the current purpose, melting of the aforesaid low-melting material performs the function of sealing in a fluid-tight way the bracket 4 on the surface of the distributor 2, with the rivet 5 set in between, in such a way as to prevent possible leakages of the refrigerant, which is designed to circulate at high pressure (in the region of 30 bar) inside the distributor 2, once the condenser 1 is in use. In other words, then, as appears from FIG. 8, the low-melting material comes to form, after melting, which takes place in the course of the brazing process, actual fluid-tight sealing means, designated as a whole by 6, between the rivet 5, the distributor 2 and the bracket 4.

From what has been described above, it is evident that, in contrast with the prior known art cited previously, tacking of the product carried out in accordance with the teachings of the present invention may be performed by means of a cold mechanical process, which can be carried out simply and fast, with practically perfect repetitiveness and in the absence of particular constraints as regards the thickness of the parts that need to be joined together. In addition to this, the tacking process described herein guarantees maintenance of the position of the component (in this case the bracket 4) during the subsequent brazing step. Energy consumption is moreover drastically reduced as compared to tacking carried out by arc spot-welding. The production line proves simpler, more economical, and of smaller encumbrance, given that the need for sound-proofing devices and fume-suction equipment, which are typical of the known art, is eliminated.

The overall costs of the product manufactured adopting the method according to the invention are thus comparatively reduced as compared to those of the prior art, with a high degree of reliability and quality of the end product and a drastic reduction in the number of rejects of the manufacturing process.

The invention has been described herein with reference to the fixing of supporting brackets 4 to the tubular distributor 2, but it is evident that the idea underlying the present invention is equally applicable to other functional components (such as manifolds, connectors, seats for filters, etc.). The invention may likewise be applied also to heat exchangers different from condensers for air-conditioning systems.

What is claimed is:

1. A heat exchanger, in particular a condenser (1) of an air-conditioning system, comprising at least one pipe (2) for circulation of a fluid under pressure and at least one component (4) rigidly fixed to said pipe (2), characterized in that said component (4) and said pipe (2) have respective through holes (4A, 2A), which are aligned with one another, for housing a rivet (5) having a flange at one end engaging an outer surface of the component and an enlarged end within the pipe engaging an inner surface of the pipe, which mechanically connects said component (4) to said pipe (2), and in that there are provided seal means (6) for sealing together said component (4), said pipe (2) and said rivet (5), and thus preventing leakage of said fluid towards the outside of the through hole (2A) defined in said pipe (2), said seal means being formed my molten material (6) present on the outer surface of said pipe (2) and/or of said component.

2. The heat exchanger according to claim 1, characterized in that it is a condenser (1) of an air conditioner for motor vehicles.

3. The heat exchanger according to claim 6, characterized in that said component is a supporting or fixing bracket (4) and/or a manifold or connector and/or a support for a filter.

4. The heat exchanger according to claim 1, characterized in that said rivet (5) is of a fluid-tight type.

5. The heat exchanger according to claim 1, characterized in that the body of said rivet (5) is made of aluminum alloy poor in silicon and magnesium having a high melting point.

6. A method for fixing components to a pipe for circulation of a fluid forming part of a heat exchanger (1), in particular a condenser of an air-conditioning system, the method envisaging at least one step of preliminary connection of at least one component (4) to the pipe (2), followed by a brazing process in order to obtain final connection of the component (4) to the pipe (2), characterized in that, in the course of said step of preliminary connection, the component (4) is mechanically fixed to the pipe (2) by means of at least one rivet (5) having a flange at one end engaging an outer surface of the component and an enlarged end within the pipe engaging an inner surface of the pipe, and in that, following upon said brazing process, fluid-tight sealing is obtained between said component (4), said pipe (2) and said rivet (5) by means of melting of surface material (6).

7. The method according to claim 6, characterized in that said rivet (5) is of the fluid-tight type.

8. The method according to claim 6, characterized in that said material (6) is a low-melting material present on the external surface of said pipe (2) and/or of said component (4).

9. The method according to claim 6, characterized in that said preliminary connection step comprises at least the following steps:

preventive definition, in said pipe (2) and in said component (4), of respective through holes (2A, 4A);

superposition of said component (4) on said pipe (2), in such a way as to achieve the reciprocal alignment between said through holes (2A, 4A);

insertion of said rivet (5) into said mutually aligned through holes (2A, 4A) in particular until a front flange (5B) of said rivet (5A) comes to bear upon an external surface of said component (4);

application of a tensile force on a shank (5C), partially inserted in the body (5A) of said rivet (5A), the transition of the end (5C') of said shank (5C) inserted in said body (5A) producing a mechanical deformation of the end area of the latter;

breaking of said shank (5C) in a pre-determined point, the part of the shank (5C) that carries said end (5C') remaining inside said body (5A), whilst the remaining part is definitely removed from the rivet (5).

10. A heat exchanger, in particular a condenser (1) of an air-conditioning system, made using the method according to claim 6.

* * * * *